Nov. 16, 1948.   C. E. MELHORN   2,453,805
GUM BREAKING MACHINE

Filed May 2, 1947   6 Sheets-Sheet 1

INVENTOR
CARL E. MELHORN
BY Chapin & Neal
ATTORNEYS

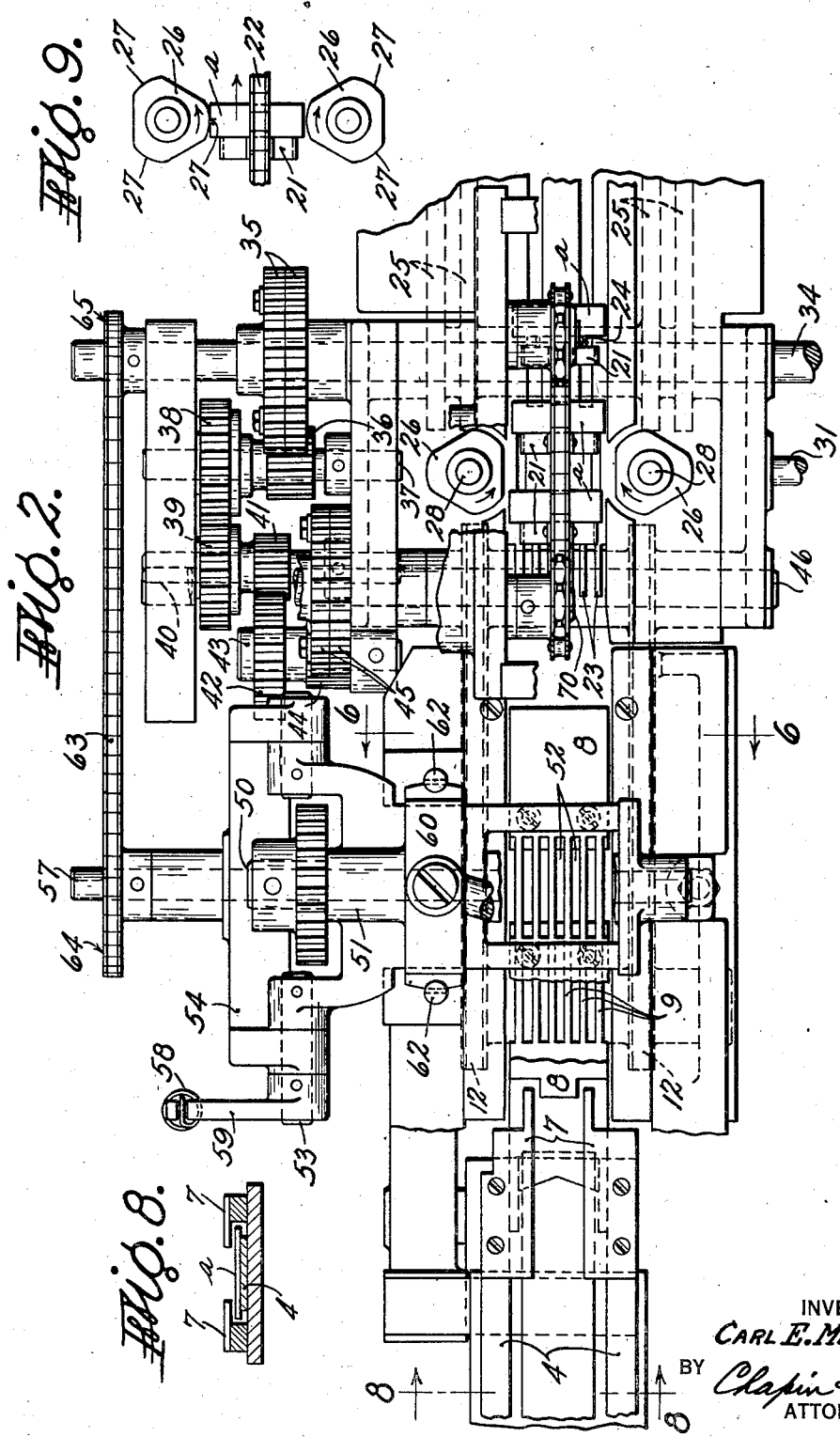

Nov. 16, 1948.  C. E. MELHORN  2,453,805
GUM BREAKING MACHINE
Filed May 2, 1947   6 Sheets-Sheet 3
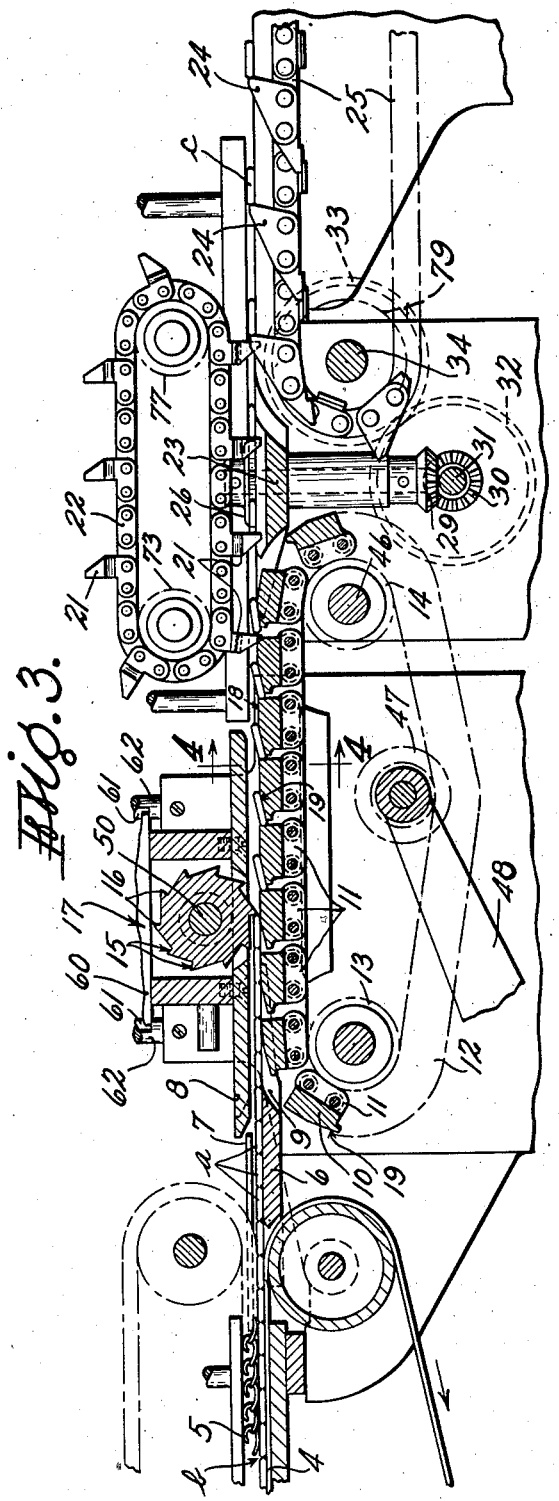
INVENTOR
CARL E. MELHORN
BY Chapin + Neal
ATTORNEYS Nov. 16, 1948.   C. E. MELHORN   2,453,805
GUM BREAKING MACHINE
Filed May 2, 1947   6 Sheets-Sheet 4
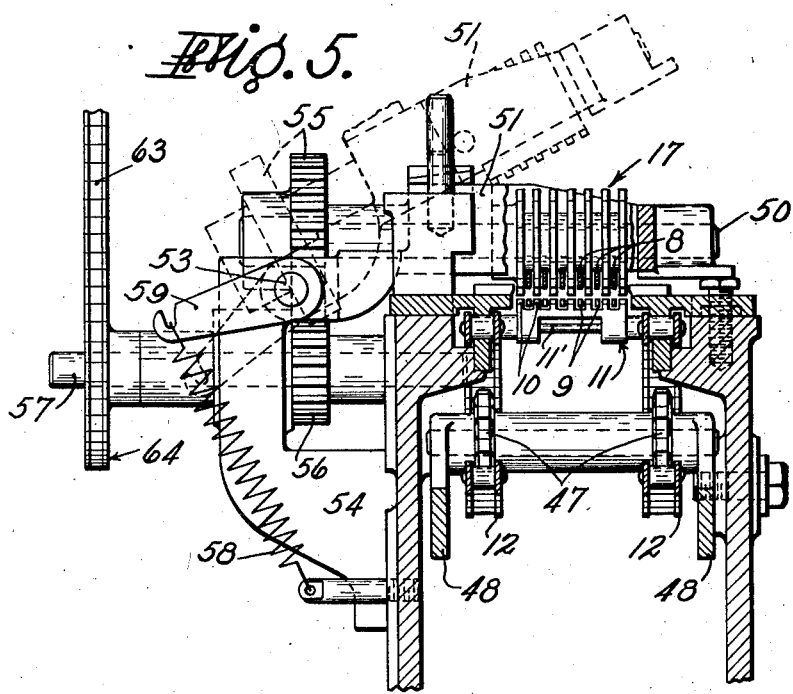
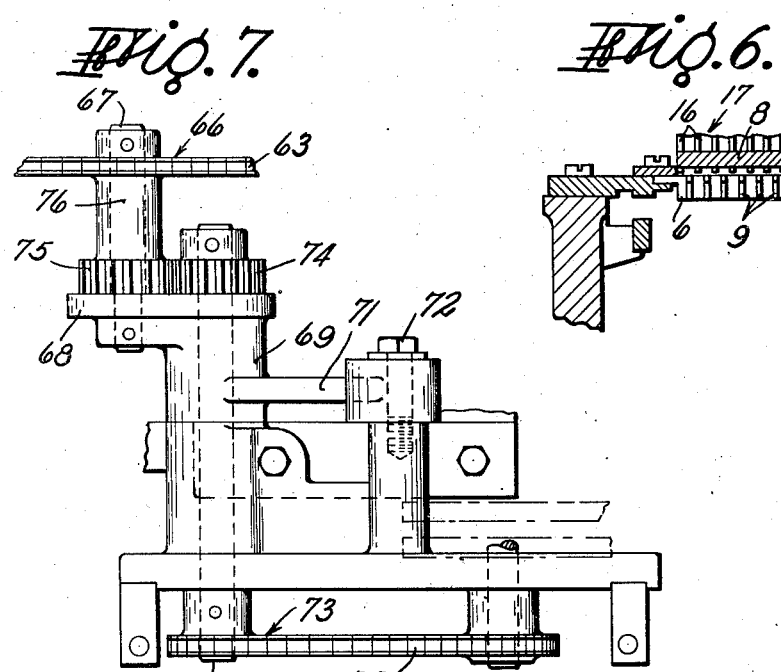
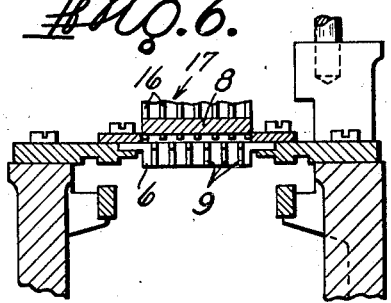
INVENTOR
CARL E. MELHORN
BY Chapin & Neal
ATTORNEYS Nov. 16, 1948.   C. E. MELHORN   2,453,805
GUM BREAKING MACHINE Filed May 2, 1947   6 Sheets-Sheet 5

INVENTOR
CARL E. MELHORN
BY Clapin & Neal
ATTORNEYS

Nov. 16, 1948.   C. E. MELHORN   2,453,805
GUM BREAKING MACHINE
Filed May 2, 1947   6 Sheets-Sheet 6
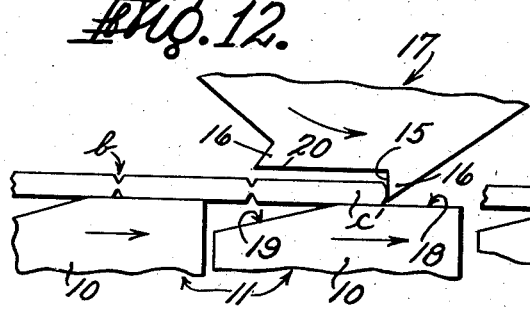
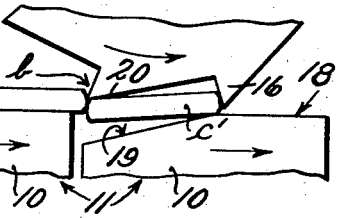
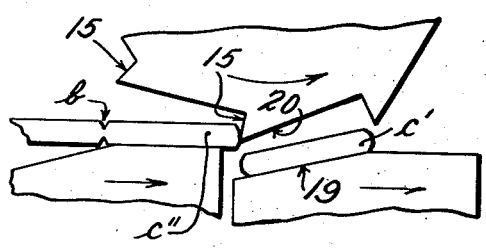
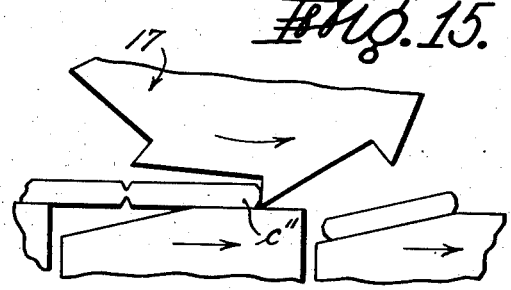
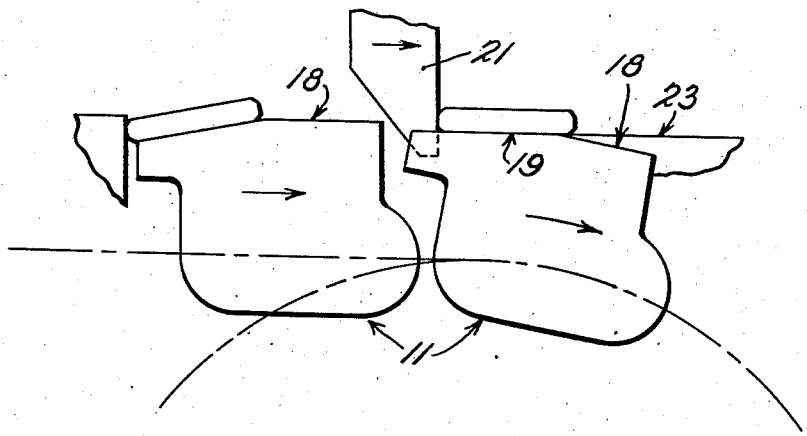
INVENTOR
CARL E. MELHORN
BY Chapin & Neal
ATTORNEYS Patented Nov. 16, 1948

2,453,805

UNITED STATES PATENT OFFICE 2,453,805

GUM BREAKING MACHINE

Carl E. Melhorn, Springfield, Mass., assignor to Package Machinery Company, East Longmeadow, Mass., a corporation of Massachusetts Application May 2, 1947, Serial No. 745,567

6 Claims. (Cl. 107—7)

This invention relates to a machine for breaking gum sticks from slabs and for delivering the broken off pieces individually to a wrapping machine or other handling device.

The present invention is in the nature of an improvement over the gum breaking machine disclosed in the prior patent to Smith and Cornock No. 2,251,172, issued July 29, 1941.

The principal object of the present invention is to provide a gum breaking device which affords more uniform and positive support to the gum slabs and sticks during and after the breaking operation, than do prior art machines.

A further object is to provide a machine of this character which will handle relatively thin slabs and sticks of gum.

A still further object is to increase the accuracy with which the gum sticks are discharged or supplied by the gum breaker machine to the wrapping instrumentalities.

Other and further objects residing in the details of construction will be made apparent in the following specification and claims.

In the accompanying drawings which illustrate one embodiment of the invention,

Fig. 2 is a plan view of the structure shown in Fig. 1, parts also being broken away;

Fig. 3 is a longitudinal sectional view;

Fig. 4 is a fragmentary sectional view substantially on line 4—4 of Fig. 3;

Fig. 5 is a fragmentary sectional view substantially on line 5—5 of Fig. 1;

Fig. 6 is a fragmentary sectional view substantially on line 6—6 of Fig. 2;

Fig. 7 is a detail plan view showing the drive for the breaker and transfer mechanisms;

Fig. 8 is a fragmentary sectional view substantially on line 8—8 of Fig. 1;

Fig. 9 is a fragmentary plan view of the centering device;

Figs. 12 to 16 inclusive are diagrammatic views showing successive stages in the operation of the gum breaking mechanism and the supporting mechanism.

Figure 1:
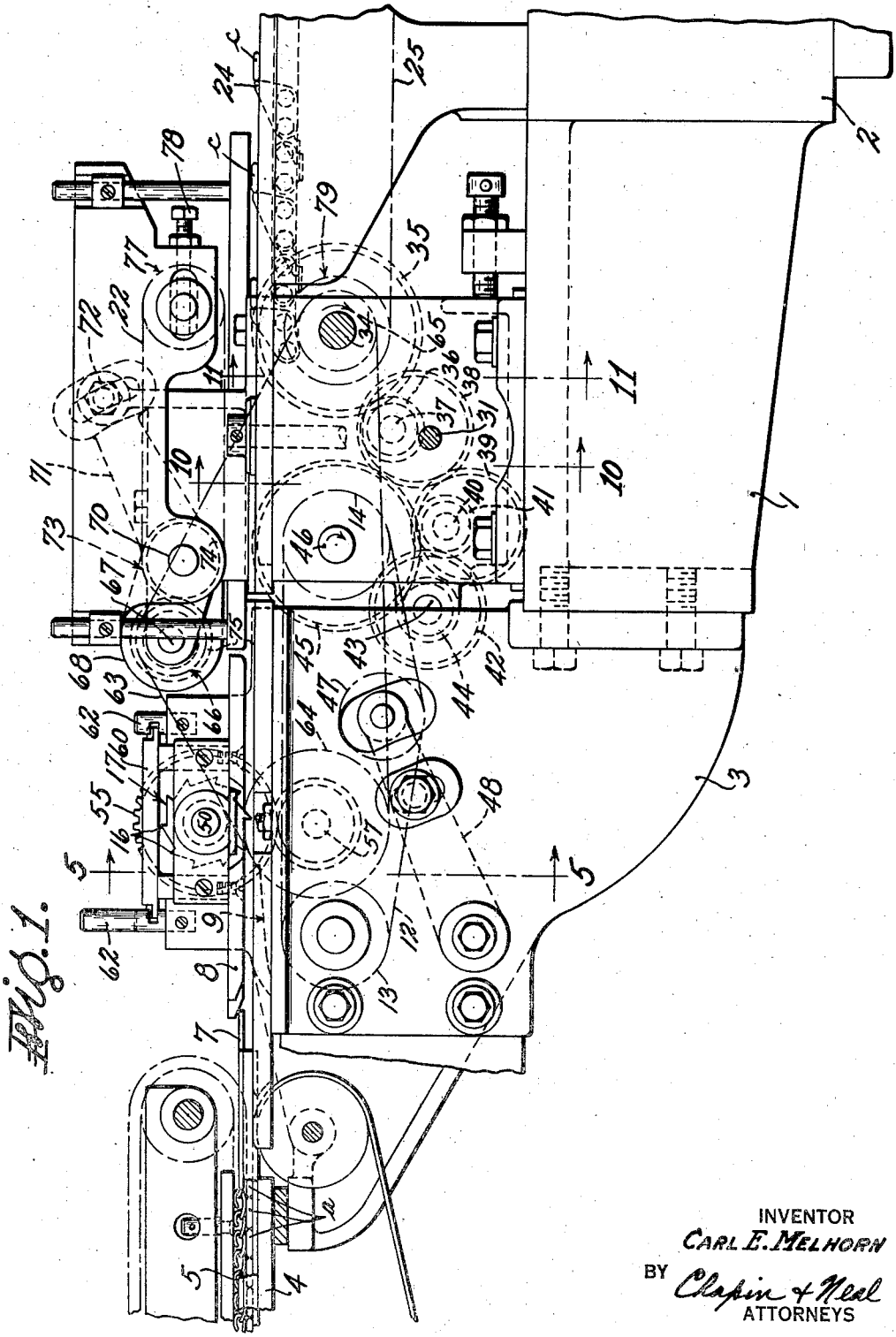
Fig. 1 is a side elevational view of the machine, parts being broken away.

Referring to the drawings the breaker and associated mechanisms are shown as supported on an extension 1 of a wrapping machine frame 2 and on a bracket 3 bolted to said extension.

As perhaps best shown in Fig. 3 the gum, in the form of slabs $a$, is delivered to the channel of the breaker mechanism by a belt 4 driven from a source not shown. A chain 5 engages the tops of the slabs on the belt to prevent the slabs from buckling. The slabs are transversely scored as indicated at $b$ providing lines of weakness along which the slabs are to be broken into individual sticks $c$. The slabs are delivered by the belt onto a platform 6 which defines the floor of the channel. Overlapping the adjacent ends of the belt 4 and platform 6 guide plates 7 are provided (Fig. 8) which extend over the edges of the slabs and maintain them in place after they pass from beneath chain 5 until they pass beneath a plate 8 which forms the upper side of the breaker channel.

The platform 6 is formed with a plurality of cuts forming fingers 9 (Fig. 6) between which ribs 10 of supporting members 11 travel. Members 11 are supported on rods 11' carried by sprocket chains 12 passing around sprockets 13 and 14.

As the gum slabs pass along platform 6 solely under the frictional drive of the belt the leading end of the slab engages the radial face 15 of one of the series of ratchet shaped teeth 16 formed on the breaker wheel or drum 17. As shown in Fig. 3 fingers 9 terminate short of the breaker drum. The breaker drum is rotated, by means later described, at a constant speed in a counter clockwise direction as viewed in Fig. 3. The contact of the leading undetached gum stick with the face 15 of the breaker drum holds up the entire gum slab on belt 4 so that the slab advances at the speed permitted by the retreating tooth face 15.

The sprocket chains 12 are continuously driven but at a varying speed to advance the upper run of the chain and its members 11 in the direction of travel of the gum. The gum engaging faces of the ribs 10 of the members 11 comprise forward portions 18 and rear portions 19. As the members 11 round sprocket 13 and the ribs 10 enter the spaces between fingers 9 the forward portions 18 lie substantially flush with the upper surfaces of the fingers 9 over which the gum slab is advancing while the portions 19 slope downwardly and rearwardly.

When the parts are in the relative position shown in Fig. 12 the members 11 are traveling faster than the gum slab and are slowing down to approximately the speed of said gum slab, bringing a point on the surface of the ribs 10, of one of the members 11, substantially at the juncture of the portions 18 and 19, as shown in Fig. 13, up to the forward edge of the leading gum stick $c'$ while the dividing line $b$ between the leading gum stick $c'$ and the next stick $c''$ of the slab is positioned just forwardly of the forward edge of the succeeding member 11. In the continued movement of the parts the chordal portion 20 of the succeeding tooth of the breaker drum presses down on the leading gum stick and shears or breaks it from the slab along the dividing line $b$ (Fig. 13) causing the severed stick $c'$ to swing onto the inclined portion 19 of the supporting member as shown in Fig. 14. At the same time, since the chordal portions 20 are of a length substantially equal to the distance between the scores b, the face 15 of the succeeding tooth of the breaker drum is interposed in the path of the advancing edge of the next undetached gum stick c''. At this point the speed of travel of chains 12 begins to increase so that by the time the leading edge of the stick c'' has advanced through the positions of Figs. 15 and 12 to the breaking position, of Fig. 13, the underlying member 11 has out-run the leading gum stick sufficiently to bring the intersection of the surfaces 18 and 19 in line with the leading edge of the gum stick as shown in the latter figure. In other words the speed-up of the members 11 between each breaking operation is substantially equal to the length of the surface portions 18 and, as is obvious in Fig. 3, the severed gum sticks are spaced that amount as they are carried forward by the supporting members.

Just before the members 11 start to round the sprocket 14 the gum sticks are engaged by pushers 21 (Figs. 3 and 10) carried by a sprocket chain 22 and transferred thereby across an intermediate platform 23. As shown in Fig. 16, at the time that pushers 21 transfer the sticks to platform 23 from the surfaces 19 the members 11 have turned sufficiently to bring the surfaces 19 into a horizontal position so that the sticks are transferred flatly and smoothly to the platform 23. From pushers 21 the sticks are taken by pushers 24, carried by chains 25, which deliver the sticks to suitable wrapping mechanisms.

Figure 10:
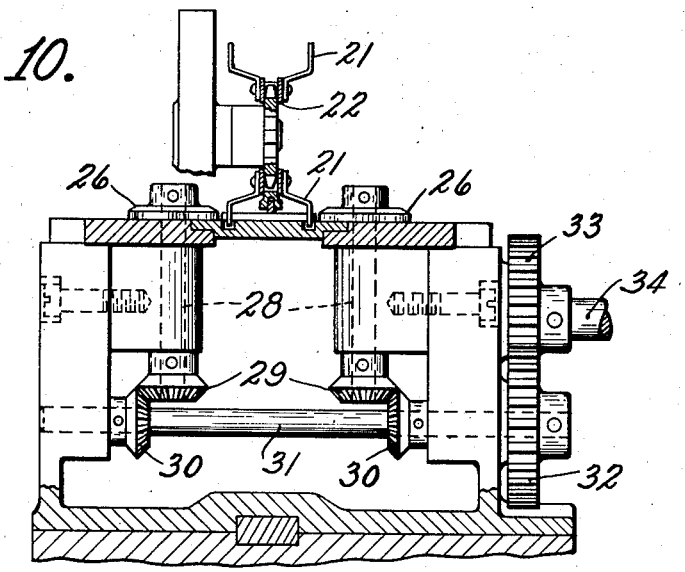
Fig. 10 is a fragmentary sectional view substantially on line 10—10 of Fig. 1.
Figure 11:
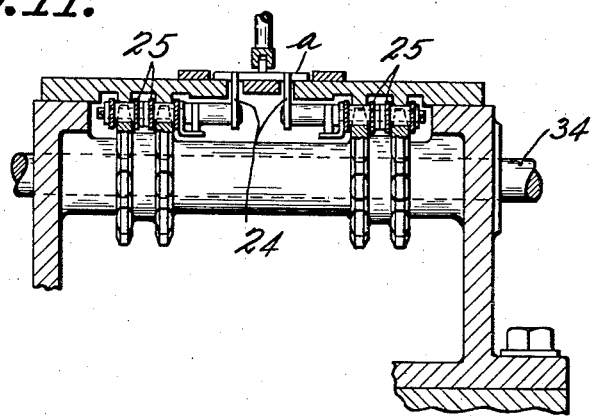
Fig. 11 is a fragmentary sectional view substantially on line 11—11 of Fig. 1.

As the gum sticks are carried over platform 23 they pass through a centering mechanism, Figs. 2, 9 and 10. This centering mechanism comprises two cam members 26 positioned on opposite sides of the path of travel of the gum sticks. Each member 26 is formed with three symmetrically arranged lobes 27. The members 26 are mounted on the upper ends of vertical shafts 28 the lower ends of which carry bevel gears 29 meshing with bevel gears 30 mounted on a shaft 31. Shaft 31 is driven to rotate the members 26 in the direction of the arrows in Fig. 2, and their rotation is timed so that as the gum sticks advance between the members the extending end of any stick not centered with respect to the pushers is engaged by a lobe of the adjacent member 26 and thereby pushed back into proper position as shown in Fig. 9. The sticks are thereby delivered to the pushers 24 of the wrapper conveyor, accurately positioned for symmetrical enclosure in the wrapper. Shaft 31 carries a gear 32 (Fig. 10) meshing with a gear 33 carried by the main drive shaft 34 which receives power from any suitable source not shown.

The chains 12 are driven at the desired varying speed from the main drive shaft 34 by a train of gears including two elliptical gears. As best shown in Figs. 1 and 2 this gear train comprises a split gear 35, mounted on the main shaft, which meshes with a gear 36 on a stub shaft 37. Stub shaft 37 carries an elliptical gear 38 which meshes with an elliptical gear 39 mounted on a stub shaft 40 which also carries a gear 41 meshing with a gear 42 on a shaft 43. The latter shaft carries a gear 44 which meshes with a split gear 45 on shaft 46 which carries the sprockets 14. Idle sprockets 47 (Figs. 1 and 3) carried by an adjustable arm 48 engage the lower run of sprocket chains 12 to maintain proper tension. By properly adjusting the elliptical gears 38 and 39 on their shafts, the movements of members 11 with respect to the breaker drum 17 may be set in the timed relation above described.

It is desirable to be able to separate the breaker drum 17 from the underlying gum supports to facilitate the removal of broken or jammed gum sticks, and the drive of the breaker drum is arranged to permit this. The drum is carried on a shaft 50 journaled in a housing 51. Shaft 50 extends cantilever fashion from the housing and the drum ratchet teeth 16 extend through openings 52 in the plate 8. Since the breaking drum has to be maintained in timed relation to the movement of the supports 11 it is desirable that the separation be accomplished without affecting the timing. For this purpose, as shown in Fig. 5, the bearing housing 51 is pivoted by a pivot stud 53 to a bracket 54. Shaft 50 carries a gear 55 which meshes with a gear 56 on a drive shaft 57. The pivot 53 is positioned between shafts 50 and 57 so that when the housing is tilted upwardly to the position shown in dotted lines in Fig. 5 the gear 55 tilts but remains in mesh with gear 56 thereby maintaining the relative position of the breaker drum with members 11 and preserving their timed relation. A spring 58, connected between an arm 59 secured to the pivot stud 53, and a fixed frame member, tends to raise the housing to open position. The housing is held releasably locked in closed position by a centrally pivoted lock bar 60 (Fig. 2) carried by the housing, the ends of bar 60 engaging in cuts 61 in studs 62 which are supported by the machine frame.

The breaker drive shaft 57 is driven by a sprocket chain 63 engaging around a sprocket 64 secured on said shaft, Figs. 1 and 5. Chain 63 also passes around a sprocket 65 on the main drive shaft 34 and over a sprocket 66 rotatably mounted on a stub shaft 67 carried by one arm 68 of a bell crank 69 pivoted on shaft 70. The other arm 71 of the bell crank is adjustably bolted at 72 to the machine frame to hold the sprocket 66 in a position to maintain the chain 63 at a proper tightness.

Sprocket 73 (Figs. 1, 3 and 7) about which the chain 22 of transfer pushers 21 engages, is secured to one end of the shaft 70. Fixed to the other end of shaft 70 is a gear 74 which meshes with a gear 75 secured to the hub 76 of sprocket 66. As will be obvious gears 74 and 75 maintain their mesh in any adjusted position of bell crank 69 to thereby drive the transfer chain 22. The other sprocket 77 of chain 22 is provided (see Fig. 1) with a conventional chain tightening adjustment as indicated at 78. The conveyor chain 25 which delivers the gum to the wrapping machine is driven sprocket 79 fixed on main drive shaft 34.

As will be apparent the above mechanism breaks the gum stick from the slab and transports it to the succeeding operation with a minimum of deviation from its original path of travel and with a minimum of strain on the gum stick. The breaking operation swings the rear edge portion of the stick from the plane of its travel only sufficiently to effect the breaking. The slab is supported at its leading edge and also closely adjacent the score line during the breaking, and the breaking is carried out when the slab and the receiving surface of the conveyor are traveling at substantially equal speeds. The speed-up of the conveyor to space the severed sticks takes place as the slab moves into position for the succeeding breaker operation and the portion of the conveyor in contact with the slab during the speed-up portion of its travel makes a smooth sliding engagement with the under surface of the slab. The severed gum sticks travel in their inclined position until the inclined portions of the supporting members are brought into the original plane of travel of the slab as the supporting members start to round the sprocket, at which point the transfer pushers, timed to the speed of the breaker conveyor, slide the sticks in a horizontal position flatly and smoothly onto the transfer platform.

What I claim is:

1. In a gum breaking machine for severing pieces of gum from slabs along score lines, extending from side to side of the slab, to form individual gum sticks; a channel along which the slabs are continuously moved, gum breaking mechanism positioned above the channel, a conveyor traveling continuously below the channel, said conveyor having portions moving flush with the floor of the channel and downwardly and rearwardly inclined portions intermediate said first portions, means actuating said breaker as an inclined portion of the conveyor passes beneath the leading unsevered gum stick in the slab to sever said stick and deposit it on said inclined portion of the conveyor, and a variable driving means, driving the conveyor at substantially the speed of the gum slab during the breaking operation and at a greater speed between breaking operations.

2. In a gum breaking machine for severing pieces of gum from slabs along score lines, extending from side to side of the slab, to form individual gum sticks; a channel along which the slabs are continuously moved, gum breaking mechanism positioned above the channel, a conveyor traveling continuously below the channel, said conveyor having portions moving flush with the floor of the channel and downwardly and rearwardly inclined portions intermediate said first portions, means actuating said breaker as an inclined portion of the conveyor passes beneath the leading unsevered gum stick in the slab to sever said stick and deposit it on said inclined portion of the conveyor, a variable driving means, driving the conveyor at substantially the speed of the gum slab during the breaking operation and at a greater speed between breaking operations, means at the discharge end of the channel to tilt said inclined portions of the conveyor into a position flush with the floor of the channel and means to transfer the gum sticks from the so tilted portions to a platform in line with the channel.

3. In a gum breaking machine for severing pieces of gum from slabs along score lines, extending from side to side of the slab, to form individual gum sticks; a channel along which the slabs are continuously moved, gum breaking mechanism positioned above the channel, a conveyor traveling continuously below the channel, said conveyor having portions moving flush with the floor of the channel and downwardly and rearwardly inclined portions intermediate said first portions, means actuating said breaker as an inclined portion of the conveyor passes beneath the leading unsevered gum stick in the slab to sever said stick and deposit it on said inclined portion of the conveyor, a variable driving means, driving the conveyor at substantially the speed of the gum slab during the breaking operation and at a greater speed between breaking operations, means at the discharge end of the channel to tilt said inclined portions of the conveyor into a position flush with the floor of the channel, means to transfer the gum sticks from the so tilted portions to a platform in line with the channel and convey the sticks across said platform, rotatable lobed centering members positioned one on each side of the path of travel of the gum sticks across the platform, and means timed with the transfer means to rotate the lobes of said centering means into contact with the adjacent ends of the sticks, if the latter are out of alignment as they pass between the members.

4. In a gum breaking machine for severing pieces of gum from a slab along score lines, extending from side to side of the slab, to form individual gum sticks; a channel along which the slabs are continuously moved, gum breaking mechanism positioned above the channel, a conveyor traveling below the channel, said conveyor having portions moving flush with the floor of the channel and downwardly and rearwardly inclined portions intermediate said first portions, a main drive shaft, a driving connection between said shaft and conveyor to continuously drive the latter, a driving connection between said shaft and breaker means for actuating the latter as an inclined portion of the conveyor passes beneath the leading unsevered gum stick in the slab, to sever said stick and deposit it on said inclined portion, said driving connection between said shaft and conveyor including elliptical gears set to drive the conveyor at substantially the speed of the gum slab during the breaking operation and at a greater speed between breaking operations.

5. In a gum breaking machine for severing pieces of gum from a slab along score lines, extending from side to side of the slab, to form individual gum sticks; a gum breaking mechanism positioned above the path of travel of the gum slab and having a portion extending into the path of travel of the slab and engaging the leading end thereof to control the speed of travel of the slab, a conveyor traveling below the path of travel of the gum slab, said conveyor having flat portions traveling in the plane of the lower surface of the slab and downwardly and rearwardly inclined portions intermediate said first portions, the length of said inclined portions being substantially equal to the spacing of the scores in the gum slab, a main drive shaft, a driving connection between said shaft and conveyor to continuously drive the latter, and a driving connection between said shaft and breaker means, said driving connection between said shaft and conveyor including elliptical gears set to position the rear edge of one of the flat portions of the conveyor beneath the leading edge portion of the leading unsevered gum stick when the speed of the conveyor reaches its minimum, the breaking cycle of the breaking means substantially coinciding with the slow speed cycle of the conveyor.

6. In a gum stick handling device, a conveyor traveling in a plane and having gum stick receiving portions inclined downwardly and rearwardly from the plane of travel of the conveyor, means adjacent the discharge end of the conveyor to tilt said inclined portions into the plane of travel and means engaging the rear edge of the gum sticks on said receiving portions as the latter are tilted into said plane to remove the sticks from said portions along a path in said plane.

CARL E. MELHORN.

No references cited.